US008118209B2

(12) United States Patent
Ohnuma

(10) Patent No.: US 8,118,209 B2
(45) Date of Patent: Feb. 21, 2012

(54) ULTRASONIC WELDING APPARATUS AND ULTRASONIC WELDING METHOD

(75) Inventor: Kentaro Ohnuma, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/861,098

(22) Filed: Aug. 23, 2010

(65) Prior Publication Data

US 2011/0042444 A1 Feb. 24, 2011

(30) Foreign Application Priority Data

Aug. 24, 2009 (JP) ................................ 2009-192765

(51) Int. Cl.
*B23K 1/06* (2006.01)

(52) U.S. Cl. .................................................. 228/110.1

(58) Field of Classification Search ........................ None
See application file for complete search history.

(56) References Cited

U.S. PATENT DOCUMENTS 1,731,218 A * 10/1929 Adams .......................... 428/605
3,708,878 A * 1/1973 Mann et al. ...................... 29/860
4,596,352 A * 6/1986 Knapp ........................... 228/1.1
4,817,814 A * 4/1989 Coto et al. ................. 228/110.1
5,423,474 A * 6/1995 Kanagawa et al. ......... 228/110.1
5,954,549 A * 9/1999 Shinchi ......................... 439/874
6,167,616 B1 * 1/2001 Shinchi ........................... 29/861
6,184,471 B1 * 2/2001 Asakura et al. ................. 174/78
6,299,052 B1 * 10/2001 Wnek et al. ................ 228/110.1
6,302,981 B1 * 10/2001 Sakaguchi et al. ........... 156/73.1
2002/0000459 A1 * 1/2002 Wnek et al. .................... 228/1.1
2002/0130159 A1 * 9/2002 Kondo ....................... 228/110.1
2003/0098332 A1 * 5/2003 Loprire ...................... 228/110.1
2004/0018777 A1 * 1/2004 Vanden Wymelenberg et al. ............................ 439/701
2004/0088857 A1 * 5/2004 Fujimoto et al. ................ 29/871
2005/0199676 A1 * 9/2005 Stroh et al. ...................... 228/1.1
2006/0068653 A1 * 3/2006 Sakaguchi et al. ............ 439/877
2006/0139742 A1 * 6/2006 Frankel et al. ............. 359/341.4
2006/0169742 A1 * 8/2006 Fujimoto et al. ............... 228/4.5
2007/0068991 A1 * 3/2007 Handel et al. .................. 228/1.1
2008/0128471 A1 * 6/2008 Eberbach et al. .............. 228/1.1
2009/0218134 A1 * 9/2009 Stroh et al. .................. 174/74 R
2010/0170935 A1 * 7/2010 Stroh et al. ................. 228/110.1
2011/0062218 A1 * 3/2011 Ohnuma .................... 228/110.1

FOREIGN PATENT DOCUMENTS

EP 154709 A1 * 9/1985

(Continued)

*Primary Examiner* — Kiley Stoner
(74) *Attorney, Agent, or Firm* — Sughrue Mion, PLLC

(57) ABSTRACT

An ultrasonic welding apparatus 1 includes an anvil equipped with a terminal clamp 3 for disposing an electrical contact part 31 connected to an electronic device and a core wire weld part 32 which ranges to the electrical contact part 31 and stacks a core wire 21 constructed by bundling plural strands, and a chip 7 which is disposed in a position opposed to the anvil and mutually welds the core wire to the terminal clamp by applying ultrasonic vibration in a state of pinching the core wire 21 and the terminal clamp 3 between the anvil and the chip and pressurizing the core wire and the terminal clamp in a direction of approaching each other. The ultrasonic welding apparatus 1 includes a core wire protrusion prevention wall 5 which is disposed in a position close to a terminal of the core wire 21 and prevents the terminal of the core wire 21 from moving to a place overlapping with the electrical contact part 31.

1 Claim, 2 Drawing Sheets

FOREIGN PATENT DOCUMENTS

| | | | | |
|---|---|---|---|---|
| JP | 2005-340107 | A | * | 12/2005 |
| JP | 2006-172927 | A | * | 6/2006 |
| JP | 2007-149421 | A | * | 6/2007 |
| JP | 2007-305314 | A | | 11/2007 |
| JP | 2009-231079 | A | * | 10/2009 |
| JP | 2010-044887 | A | * | 2/2010 |

* cited by examiner

ULTRASONIC WELDING APPARATUS AND ULTRASONIC WELDING METHOD

BACKGROUND

1. Field of the Invention

The present invention relates to an ultrasonic welding apparatus and an ultrasonic welding method, and particularly to the ultrasonic welding apparatus for ultrasonically welding a core wire constructed by bundling plural strands to a terminal clamp, and the ultrasonic welding method.

2. Description of the Related Art

An automobile as a mobile unit is equipped with various electronic devices. In the automobile, a wire harness is cabled in order to transmit, for example, a control signal from a controller or electric power from a power source such as a battery to the electronic devices. The wire harness includes plural electric wires, a terminal clamp attached to a terminal of the electric wires, etc.

Each of the electric wires includes a core wire constructed by bundling plural conductive strands, and an insulating coat part for coating the core wire. The core wire exposed by eliminating the coat part of a terminal of this electric wire is welded to the terminal clamp. The core wire of the electric wire is connected to the terminal clamp using, for example, an ultrasonic welding apparatus (see Patent Reference 1).

For example, an ultrasonic welding apparatus 101 as shown in FIG. 3 is proposed in Patent Reference 1. As shown in FIG. 3, the ultrasonic welding apparatus 101 includes an anvil (not shown) equipped with a terminal clamp 103 including an electrical contact part 131 in which a connection hole 131*a* connected to a connection terminal disposed in the electronic device is disposed and a core wire weld part 132 which ranges to the electrical contact part 131 and stacks a core wire 121 constructed by bundling plural strands, and a chip 107 opposed to the anvil. Ultrasonic vibration is applied to the chip 107 by a vibrator (not shown). The ultrasonic welding apparatus 101 moves the chip 107 toward the core wire 121 and the core wire weld part 132 (as shown by an arrow). Consequently, the core wire 121 is mutually connected to the terminal clamp 103 by applying ultrasonic vibration in a state of pinching the core wire 121 and the core wire weld part 132 between the chip 107 and the anvil and pressurizing the core wire 121 and the core wire weld part 132 in a direction of approaching each other.

Patent Reference 1: JP-A-2007-305314

However, in the ultrasonic welding apparatus 101 shown in Patent Reference 1 described above, there was fear that a portion of the terminal of the core wire 121 moves (protrudes) to a place overlapping with the electrical contact part 131 in the case of applying ultrasonic vibration in a state of pinching the core wire 121 and the core wire weld part 132 between the chip 107 and the anvil and pressurizing the core wire 121 and the core wire weld part 132 in the direction of approaching each other. As a result of this, in the case of connecting the electronic device to the terminal clamp 103, an operator must screw a nut through a bolt after the connection terminal of the electronic device is stacked on the connection hole 131*a* of the terminal clamp 103 and a portion of the terminal of the protruding core wire 121 is eliminated so as not to be pinched between the electrical contact part 131 and the head of the bolt, and there was a problem that it takes time to do attachment work for attaching the wire harness to the electronic device. Also, there was a problem of spoiling beauty of the wire harness attached to the electronic device in a state in which the portion of the core wire 121 protrudes thus.

SUMMARY

Therefore, an object of the invention is to provide an ultrasonic welding apparatus and an ultrasonic welding method for manufacturing a wire harness capable of preventing spoilage of beauty and improving attachment workability in the case of being attached to an electronic device.

In an ultrasonic welding apparatus including an anvil equipped with a terminal clamp for disposing an electrical contact part connected to an electronic device and a core wire weld part which ranges to the electrical contact part and stacks a core wire constructed by bundling plural strands, and a chip which is disposed in a position opposed to the anvil and mutually welds the core wire to the core wire weld part by applying ultrasonic vibration in a state of pinching the core wire and the core wire weld part between the anvil and the chip and pressurizing the core wire and the core wire weld part in a direction of approaching each other, the ultrasonic welding apparatus of the invention is characterized by including a core wire protrusion prevention wall which is disposed in a position close to a terminal of the core wire and prevents the terminal of the core wire from moving to a place overlapping with the electrical contact part.

In an ultrasonic welding method including a first step of equipping an anvil with a terminal clamp for disposing an electrical contact part connected to an electronic device, a second step of stacking a core wire constructed by bundling plural strands on a core wire weld part ranging to the electrical contact part, and a third step of mutually welding the core wire to the core wire weld part by applying ultrasonic vibration in a state of pinching the core wire and the core wire weld part between the anvil and the chip and pressurizing the core wire and the core wire weld part in a direction of approaching each other, the ultrasonic welding method of the invention is characterized in that in the second step, a terminal of the core wire is arranged in a position close to a core wire protrusion prevention wall for preventing the terminal of the core wire from moving to a place overlapping with the electrical contact part.

According to the ultrasonic welding apparatus of the invention, the ultrasonic welding apparatus includes the core wire protrusion prevention wall which is disposed in the position close to the terminal of the core wire and prevents the terminal of the core wire from moving to the place overlapping with the electrical contact part, so that in the case of applying ultrasonic vibration in a state of pinching the core wire and the core wire weld part between the anvil and the chip and pressurizing the core wire and the core wire weld part in the direction of approaching each other, a portion of the terminal of the core wire is welded to the terminal clamp without moving (protruding) to the place overlapping with the electrical contact part, with the result that an operator can screw a nut through a bolt after the connection terminal of the electronic device is stacked on the connection hole of the terminal clamp in the case of connecting the electronic device to the terminal clamp, so that the ultrasonic welding apparatus for manufacturing the wire harness for improving attachment workability in the case of being attached to the electronic device can be provided.

Also, a portion of the terminal of the core wire is attached to the electronic device in a state of being welded to the terminal clamp without moving (protruding) to the place overlapping with the electrical contact part, so that the ultrasonic welding apparatus for manufacturing the wire harness for preventing spoilage of beauty can be provided.

According to the ultrasonic welding method of the invention, in the second step, the terminal of the core wire is arranged in the position close to the core wire protrusion prevention wall for preventing the core wire from moving to the place overlapping with the electrical contact part, so that in the case of applying ultrasonic vibration in a state of pinching the core wire and the core wire weld part between the anvil and the chip and pressurizing the core wire and the core wire weld part in the direction of approaching each other, a portion of the terminal of the core wire is welded to the terminal clamp without moving (protruding) to the place overlapping with the electrical contact part, with the result that an operator can screw a nut through a bolt after the connection terminal of the electronic device is stacked on the connection hole of the terminal clamp in the case of connecting the electronic device to the terminal clamp, so that the ultrasonic welding method for manufacturing the wire harness for improving attachment workability in the case of being attached to the electronic device can be provided.

Also, a portion of the terminal of the core wire is attached to the electronic device in a state of being welded to the terminal clamp without moving (protruding) to the place overlapping with the electrical contact part, so that the ultrasonic welding method for manufacturing the wire harness for preventing spoilage of beauty can be provided.

DESCRIPTION OF THE PREFERRED EMBODIMENTS

Figure 1:
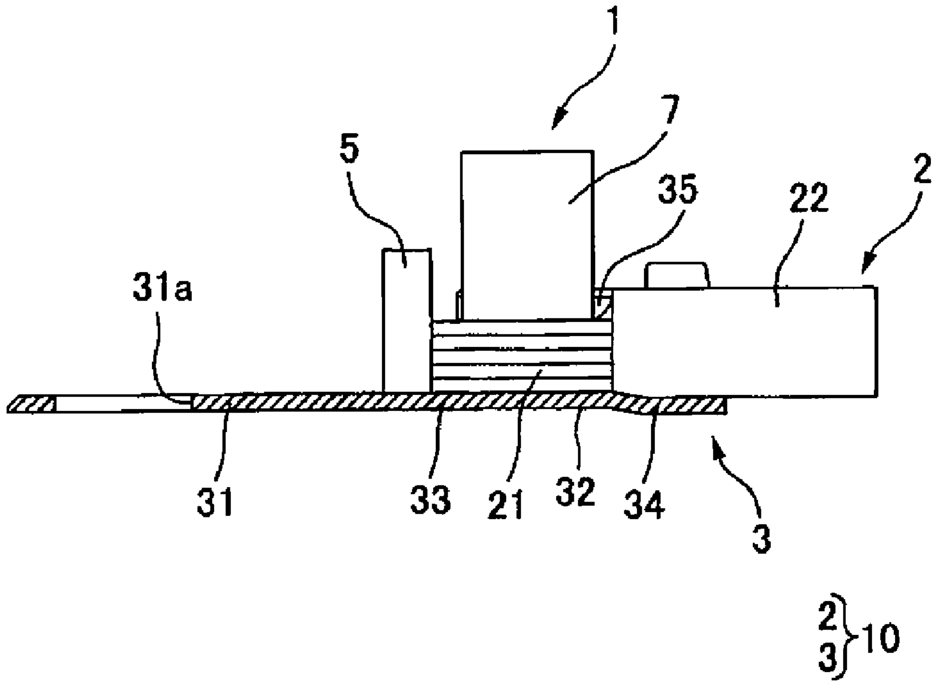
FIG. 1 is an explanatory diagram explaining ultrasonic welding work of an ultrasonic welding apparatus shown in one embodiment of the invention, and is a partially sectional side view showing a situation in which an anvil (not shown) is equipped with a terminal clamp for stacking a core wire and the terminal clamp is pressurized by a chip.
Figure 2:
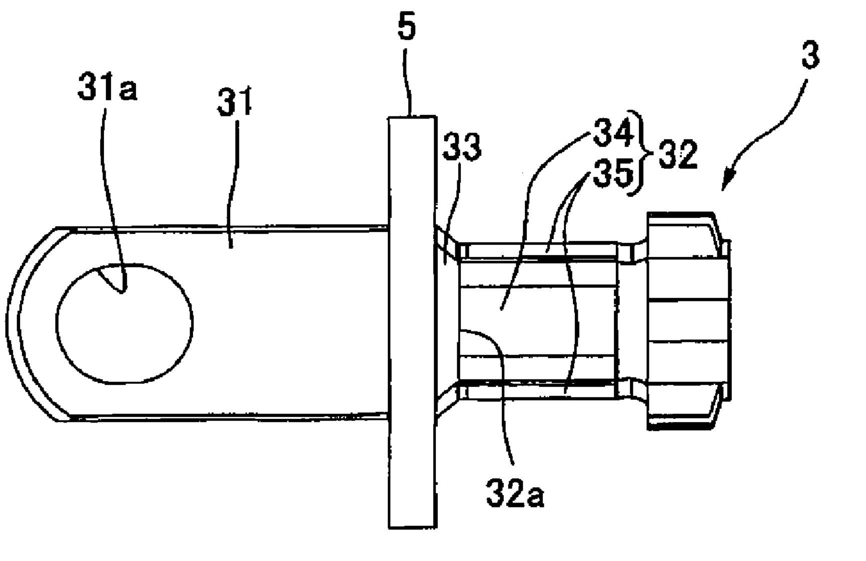
FIG. 2 is a top view showing a state of equipping the ultrasonic welding apparatus shown in FIG. 1 with the terminal clamp.
Figure 3:
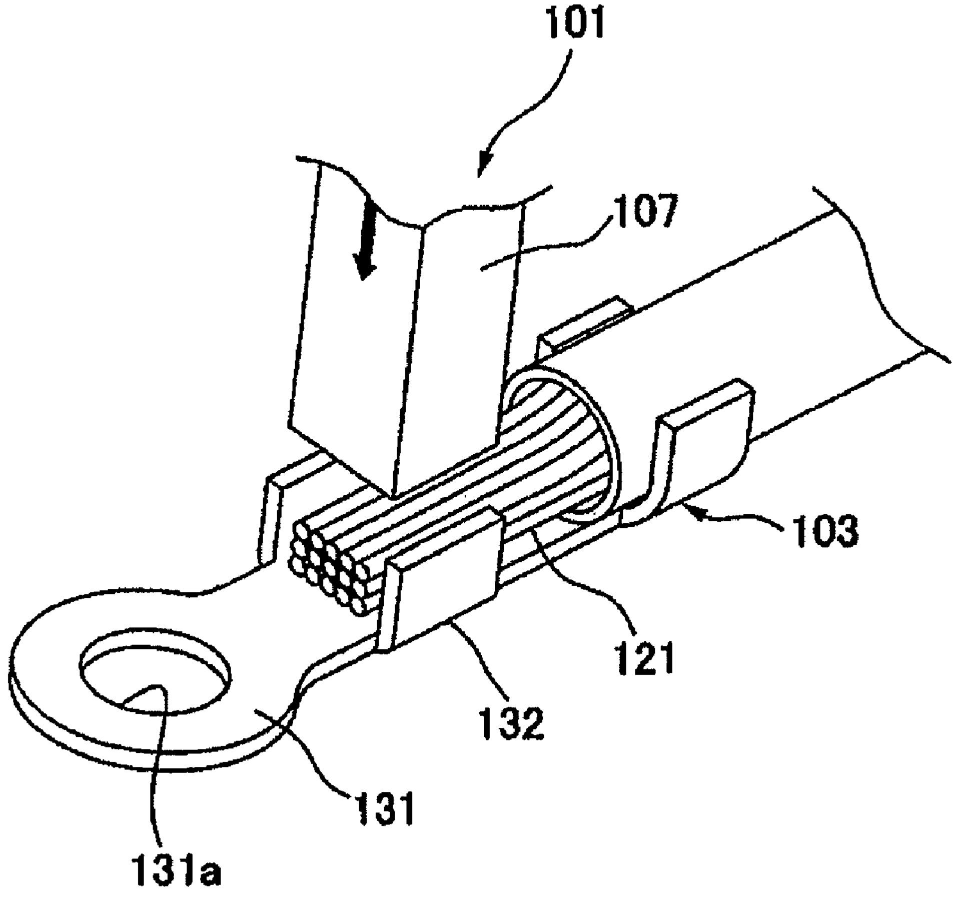
FIG. 3 PRIOR ART
FIG. 3 is a perspective view showing a situation in which a conventional ultrasonic welding apparatus is equipped with a terminal clamp for stacking a core wire and the terminal clamp is pressurized by a chip.

One embodiment of the invention will hereinafter be described with reference to FIGS. 1 and 2. An automobile as a mobile unit is equipped with various electronic devices. In the automobile, a wire harness 10 is cabled in order to transmit, for example, a control signal from a controller or electric power from a power source such as a battery to the electronic devices. The wire harness 10 includes plural electric wires 2, and a terminal clamp 3 attached to a terminal of the electric wires 2.

The ultrasonic welding apparatus 1 is used for electrically connecting the electric wire 2 to the terminal clamp 3 mutually. A cross-sectional shape of the electric wires 2 is formed in a round shape. The electric wire 2 includes a core wire 21 constructed by bundling plural strands made of conductive metal such as copper or copper alloy, and an insulating coat part 22. The coat part 22 is made of an insulating synthetic resin, and coats the core wire 21. The core wire 21 exposed by eliminating the coat part 22 of a terminal of this electric wire 2 is mutually welded to the terminal clamp 3.

The terminal clamp 3 is obtained by bending a metal plate material punched in a predetermined shape, and integrally includes an electrical contact part 31 in which a connection hole 31*a* connected to a connection terminal disposed in the electronic device is disposed, a core wire weld part 32 to which the core wire 21 is welded, and a core wire movement part 33 disposed between the electrical contact part 31 and the core wire weld part 32. That is, the core wire weld part 32 ranges to the electrical contact part 31.

The core wire weld part 32 includes a bottom wall part 34 for stacking the core wire 21, and a pair of erect wall parts 35 which are erected from both edges of a width direction of this bottom wall part 34 and position the core wire 21 between the mutual erect wall parts. Then, a terminal of the core wire 21 is stacked on an end 32*a* by the core wire movement part 33 of the core wire weld part 32.

The core wire movement part 33 allows the terminal of the core wire 21 stacked on the end 32*a* by the core wire movement part 33 of the core wire weld part 32 to move (protrude) to an end by the electrical contact part 31 of the core wire movement part 33 in the case of mutually welding the core wire 21 to the core wire weld part 32 by applying ultrasonic vibration in a state of pressurizing the core wire 21 and the core wire weld part 32 in a direction of approaching each other.

The ultrasonic welding apparatus 1 mutually welds the core wire 21 to the terminal clamp 3 by applying ultrasonic vibration in a state of stacking the core wire 21 on the core wire weld part 32 and pressurizing the core wire 21 and the core wire weld part 32 in the direction of approaching each other. The ultrasonic welding apparatus 1 includes an apparatus body (not shown) installed on a floor etc. of a factory, an anvil (not shown) fixed to the apparatus body, a chip (also called a tool chip) 7 disposed in a position opposed to the anvil, a press jig (not shown), a voltage vibrator (not shown) as a driving source, a core wire protrusion prevention wall 5, and a control circuit (not shown) as control means as shown in FIGS. 1 and 2.

The anvil is disposed in a position opposed to the chip 7 described below along a vertical direction, and pinches the core wire 21 and the terminal clamp 3 between the chip 7 and the anvil. Also, an end face whose anvil is mutually opposed to the chip 7 is formed in a flat shape along a direction orthogonal to a direction in which the anvil is mutually opposed to the chip 7. Then, the end face of the anvil is equipped with the core wire weld part 32 (that is, the terminal clamp 3) on which the core wire 21 is stacked, and the core wire protrusion prevention wall 5 for preventing the terminal of the core wire 21 from moving to a place overlapping with the electrical contact part 31 is positioned in the end by the core wire movement part 33 of the electrical contact part 31 of this terminal clamp 3.

The chip 7 is attached to a press jig described below and the chip 7 moves slidably along the vertical direction by this press jig.

The press jig includes, for example, a piston of an oil hydraulic cylinder. The press jig is attached to the apparatus body. Since the chip 7 is disposed slidably along the vertical direction by this press jig, the chip 7 can mutually be connected to and disconnected from the anvil when a force is applied from the press jig.

A piezoelectric vibrator is applied by a power source (not shown) etc. and vibrates (ultrasonically vibrates) at, for example, frequencies from 10 kHz to 80 kHz. The piezoelectric vibrator is attached to only the chip 7. This piezoelectric vibrator vibrates (ultrasonically vibrates) the chip 7 by a vibrator (not shown). That is, the piezoelectric vibrator applies ultrasonic vibration to the chip 7. In addition, the ultrasonic vibration refers to vibration obtained by applying a voltage to the piezoelectric vibrator and, for example, vibrating this piezoelectric vibrator and converting electrical energy into mechanical vibration.

The core wire protrusion prevention wall 5 is formed in a plate shape. The core wire protrusion prevention wall 5 is disposed along a direction orthogonal to the end face whose anvil is mutually opposed to the chip 7, and is fixed to the apparatus body. Also, the core wire protrusion prevention wall 5 is positioned in the end by the core wire movement part 33 of the electrical contact part 31, so that the core wire protrusion prevention wall 5 is disposed in a position close to the terminal of the core wire 21 when the terminal of the core wire 21 is stacked on the end 32*a* by the core wire movement part 33 of the core wire weld part 32 and also the core wire 21 is stacked on the bottom wall part 34 of the terminal clamp 3 with which the end face of the anvil is equipped and the core wire 21 is positioned between the pair of erect wall parts 35. The core wire protrusion prevention wall 5 prevents the terminal of the core wire 21 stacked on the end 32*a* from moving (protruding) to the place overlapping with the electrical contact part 31 in the case of applying the ultrasonic vibration in a state of pinching the core wire 21 and the terminal clamp 3 between the anvil and the chip 7 and pressurizing the core wire 21 and the terminal clamp 3 in a direction of approaching each other.

The control circuit performs control of the whole ultrasonic welding apparatus 1 by connecting the piezoelectric vibrator to the press jig and controlling these operations.

Next, the ultrasonic welding apparatus 1 of the configuration described above welds the terminal clamp 3 to the core wire 21 of the electric wire 2 as described below. First, the anvil of the ultrasonic welding apparatus 1 is mutually moved away from the chip 7 and the end face of the anvil is equipped with the terminal clamp 3 so as to arrange the terminal clamp 3 in a position in which the core wire protrusion prevention wall 5 is positioned in the end by the core wire movement part 33 of the electrical contact part 31 of this terminal clamp 3. Next, the terminal of the core wire 21 exposed by peeling the coat part 22 of the terminal of this electric wire 2 is stacked on the end 32*a* by the core wire movement part 33 of the core wire weld part 32 and the core wire 21 is stacked on the bottom wall part 34 of the terminal clamp 3 with which the end face of the anvil is equipped and the core wire 21 is positioned between the pair of erect wall parts 35. Then, the press jig is moved from the upper portion of the vertical direction toward the lower portion and the chip 7 fixed to the press jig is inserted between the pair of erect wall parts 35 and the piezoelectric vibrator is vibrated in a state of being pressurized in a direction of moving the chip 7 toward the anvil and this vibration is applied to the core wire 21 and the terminal clamp 3 through the chip 7. When the core wire 21 and the terminal clamp 3 are pinched between the anvil and the chip 7 and ultrasonic vibration is applied thus, the terminal clamp 3 and the core wire 21 made of metal mutually overlap and are contacted, so that a metal bond between the terminal clamp 3 and the core wire 21 mutually overlapping is performed mutually gradually in a solid phase in a state of no melt. In this case, (a portion of) the terminal of the core wire 21 to which the ultrasonic vibration is applied moves from the end 32*a* by the core wire movement part 33 of the core wire weld part 32 and makes close contact with the core wire protrusion prevention wall 5. Thus, the core wire 21 and the terminal clamp 3 are mutually welded by the so-called ultrasonic welding (also called ultrasonic welding). That is, the electric wire 2 is electrically connected to the terminal clamp 3.

When the control circuit pressurizes the core wire 21 and the terminal clamp 3 in the direction of approaching each other by the chip 7 attached to the press jig at a predetermined applied pressure and detects that the piezoelectric vibrator is vibrated for a predetermined time, vibration of the piezoelectric vibrator is stopped. Thereafter, the control circuit moves the press jig upward, and moves the chip 7 attached to the press jig away from the anvil. The core wire 21 and the terminal clamp 3 mutually welded are taken out of the end face of the anvil after the chip 7 is moved sufficiently away from the anvil thus.

According to the invention described above, the ultrasonic welding apparatus 1 includes the core wire protrusion prevention wall 5 which is disposed in the position close to the terminal of the core wire 21 and prevents the terminal of the core wire 21 from moving to the place overlapping with the electrical contact part 31, so that in the case of applying ultrasonic vibration in a state of pinching the core wire 21 and the core wire weld part 32 between the anvil and the chip 7 and pressurizing the core wire 21 and the core wire weld part 32 in the direction of approaching each other, a portion of the terminal of the core wire 21 is welded to the terminal clamp 3 without moving (protruding) to the place overlapping with the electrical contact part 31, with the result that an operator can screw a nut through a bolt after the connection terminal of the electronic device is stacked on the connection hole 31*a* of the terminal clamp 3 in the case of connecting the electronic device to the terminal clamp 3, so that the ultrasonic welding apparatus 1 for manufacturing the wire harness 10 for improving attachment workability in the case of being attached to the electronic device can be provided.

Also, a portion of the terminal of the core wire 21 is attached to the electronic device in a state of being welded to the terminal clamp 3 without moving (protruding) to the place overlapping with the electrical contact part 31, so that the ultrasonic welding apparatus 1 for manufacturing the wire harness 10 for preventing spoilage of beauty can be provided.

In addition, the embodiment described above only shows a typical form of the invention, and the invention is not limited to the embodiment. That is, various modifications can be made without departing from the gist of the invention.

What is claimed is:

1. An ultrasonic welding method comprising:

providing an anvil with a terminal clamp comprising an electrical contact part including a pair of opposed edges and connected to an electronic device, stacking a core wire constructed by bundling plural strands on a core wire weld part extending from the electrical contact part, and mutually welding the core wire to the core wire weld part by applying ultrasonic vibration in a state of pinching the core wire and the core wire weld part between the anvil and the chip and pressurizing the core wire and the core wire weld part in a direction of approaching each other, wherein in the stacking step, a terminal of the core wire is arranged in a position close to a core wire protrusion prevention wall comprising a pair of opposed edges which extend outwardly beyond the pair of opposed edges of the electrical contact part to prevent the terminal of said core wire from moving to a place overlapping with the electrical contact part.

* * * * *